(12) United States Patent
Senshiki

(10) Patent No.: US 11,997,434 B2
(45) Date of Patent: May 28, 2024

(54) DISPLAY METHOD AND DISPLAY SYSTEM

(71) Applicant: SEIKO EPSON CORPORATION, Tokyo (JP)

(72) Inventor: Hiroki Senshiki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 18/211,040

(22) Filed: Jun. 16, 2023

(65) Prior Publication Data

US 2023/0412782 A1   Dec. 21, 2023

(30) Foreign Application Priority Data

Jun. 17, 2022   (JP) ................... 2022-097868

(51) Int. Cl.
   *H04N 9/31*       (2006.01)
   *G06F 3/041*      (2006.01)
   *G06F 3/042*      (2006.01)
   *G06F 3/0488*     (2022.01)

(52) U.S. Cl.
   CPC ....... *H04N 9/3194* (2013.01); *G06F 3/04186* (2019.05); *G06F 3/0421* (2013.01); *G06F 3/0488* (2013.01); *H04N 9/3147* (2013.01); *G06F 2203/04106* (2013.01); *G06F 2203/048* (2013.01)

(58) Field of Classification Search
   CPC .......... H04N 9/3194; H04N 9/3147; G06F 3/04186; G06F 3/0421; G06F 3/0488; G06F 2203/04106; G06F 2203/048
   See application file for complete search history.

(56) References Cited

U.S. PATENT DOCUMENTS

| | | | |
|---|---|---|---|
| 2018/0255266 A1* | 9/2018 | Tamura | G06F 3/0425 |
| 2020/0371605 A1* | 11/2020 | Yoshida | G06F 3/0425 |
| 2023/0022806 A1* | 1/2023 | Ikeda | G06F 3/042 |

FOREIGN PATENT DOCUMENTS

| | | | | |
|---|---|---|---|---|
| JP | 2017-133871 | * | 2/2016 | .......... G06F 3/0346 |
| JP | 2017-138871 A | | 8/2017 | |
| WO | 2021/140921 A1 | | 7/2021 | |

\* cited by examiner

*Primary Examiner* — Jonathan A Boyd
(74) *Attorney, Agent, or Firm* — Oliff PLC

(57) ABSTRACT

A projector includes a first acquisition unit, a detection unit, a second acquisition unit, and a display control unit. The first acquisition unit acquires a captured image of a range containing a display surface by a camera. The detection unit detects a first bright point and a second bright point corresponding to reflected lights of a first light and a second light radiated substantially parallel to the display surface by a pointer from the captured image. When a distance between a position of the first bright point and a position of the second bright point is less than a first threshold, the second acquisition unit acquires a third position determined based on the first bright point and the second bright point. The display control unit displays a display image containing a drawn image by the pointer in the third position.

5 Claims, 4 Drawing Sheets

DISPLAY METHOD AND DISPLAY SYSTEM

The present application is based on, and claims priority from JP Application Serial Number 2022-097868, filed Jun. 17, 2022, the disclosure of which is hereby incorporated by reference herein in its entirety.

BACKGROUND

1. Technical Field

The present disclosure relates to a display method and a display system.

2. Related Art

An interactive projector displays an image showing a drawn line by a user when the user makes a motion to draw a character or a figure using a pointer such as a finger on a display surface for image display. An example of the interactive projector includes a projector detecting a position of the pointer by imaging bright points generated when the pointer crosses a light such as an IR (infraRed) light radiated along the display surface for detection of the pointer using a camera. The light radiated along the display surface is called a light curtain and a radiation apparatus radiating the light curtain is called a light curtain unit or a finger touch unit.

When a display surface is larger and it may be possible for a single interactive projector to display an image only in a part of the display surface, a display system may be configured by a plurality of interactive projectors arranged in line. However, when a plurality of interactive projectors detecting a position of a pointer using light curtains are arranged in line and used, the light curtains of the adjacent interactive projectors may partially overlap. When the pointer crosses the overlapping two light curtains, two bright points may be imaged for one pointer in each of the interactive projectors. When the two bright points are imaged for one pointer, a defect that a drawn line drawn by a user is doubly drawn or the drawn line is jaggedly drawn may be caused. Various techniques for avoiding the defect are proposed and a technique disclosed in JP-A-2017-138871 is taken as an example. In the technique disclosed in JP-A-2017-138871, radiation timing of the light curtains of the interactive projectors adjacent to each other is varied on the time axis, and thereby, imaging of two bright points for one pointer is avoided.

In a case where a first interactive projector and a second interactive projector are arranged in line and used, when radiation timing of light curtains corresponding to the respective interactive projectors is varied on the time axis, while the light curtain corresponding to one interactive projector is radiated, it may be impossible for the other interactive projector to detect a pointer and temporal resolution for the detection of the position of the pointer is degraded. When the temporal resolution for the detection of the pointer is degraded, there is a problem that the continuous detection of the position of the pointer may be hard and the displayed drawn line is jagged.

SUMMARY

A display method according to an aspect of the present disclosure includes acquiring a captured image by using a camera imaging a range containing a display surface, detecting a first bright point corresponding to a reflected light of a first light radiated substantially parallel to the display surface and a second bright point corresponding to a reflected light of a second light radiated substantially parallel to the display surface from the captured image, when a distance between the first bright point and the second bright point in the captured image is less than a first threshold, acquiring a third position determined based on the first bright point and the second bright point in the captured image, and displaying a display image containing a drawn image in the third position on the display surface.

A display system according to an aspect of the present disclosure includes a display apparatus displaying an image on a display surface, and a camera imaging a range containing the display surface. The display apparatus executes acquiring a captured image by the camera, detecting a first bright point corresponding to a reflected light of a first light radiated substantially parallel to the display surface and a second bright point corresponding to a reflected light of a second light radiated substantially parallel to the display surface from the captured image, when a distance between the first bright point and the second bright point in the captured image is less than a first threshold, acquiring a third position determined based on the first bright point and the second bright point in the captured image, and displaying a display image containing a drawn image in the third position on the display surface.

DESCRIPTION OF EXEMPLARY EMBODIMENTS

As below, technically preferable various limitations are added to the following embodiments. However, the embodiments of the present disclosure are not limited to the following configurations.

1. EMBODIMENT

Figure 1:
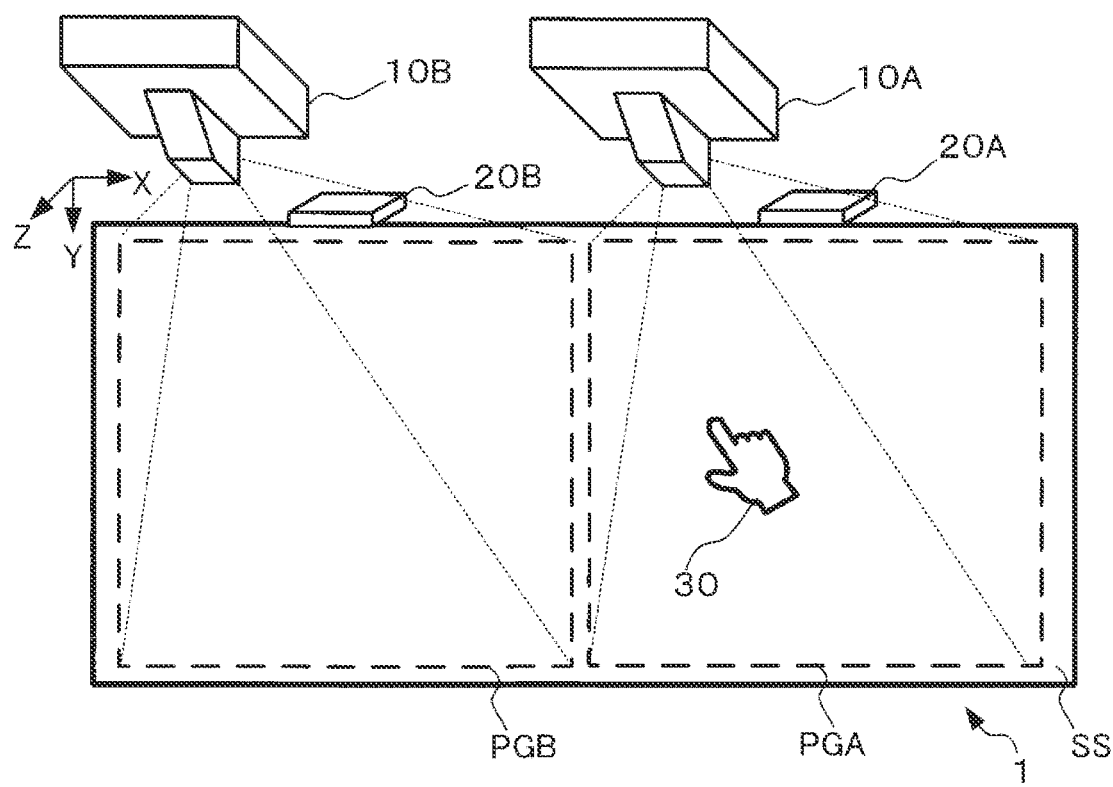
FIG. 1 shows a configuration example of a display system according to an embodiment of the present disclosure.

FIG. 1 shows a configuration example of a display system 1 according to one embodiment of the present disclosure. The display system 1 includes a projector 10A, a projector 10B, a radiation apparatus 20A and a radiation apparatus 20B. An image supply apparatus (not shown) is coupled to the projector 10A and the projector 10B by wired or wireless connection. The projector 10A displays a display image PGA according to image data shared from the image supply apparatus (not shown) on a display surface SS such as a projection screen. Similarly, the projector 10B displays a display image PGB according to image data shared from the image supply apparatus (not shown) on the display surface SS. The projector 10A and the projector 10B are placed on a ceiling of a room in which the display surface SS is placed. The image data respectively supplied from the image supply apparatus to the projector 10A and the projector 10B includes image data representing materials in a conference or the like or image data representing educational materials in a school or the like. A specific example of the image supply apparatus includes e.g., a personal computer.

When a user makes a motion to draw a character or a figure on the display surface SS using a pointer 30, the projector 10A displays the display image PGA containing a drawn image showing a drawn line of the user on the display surface SS. The display image PGA is an image formed by superimposition of the drawn image showing the drawn line of the user on the image represented by the image data shared from the image supply apparatus. The pointer 30 in the embodiment is a finger of the user, but may be a touch pen. Similarly, when the user makes a motion to draw a character or a figure on the display surface SS using the pointer 30, the projector 10B displays the display image PGB containing a drawn image showing a drawn line of the user on the display surface SS. Also, the display image PGB is an image formed by superimposition of the drawn image showing the drawn line of the user on the image represented by the image data shared from the image supply apparatus. That is, the projector 10A and the projector 10B are interactive projectors. Hereinafter, when it is not necessary to distinguish the projector 10A and the projector 10B, the projector 10A and the projector 10B are referred to as "projector 10". Note that, hereinafter, as shown in FIG. 1, a coordinate axis along the normal of the display surface SS is referred to as "Z-axis", a coordinate axis along the vertical direction is referred to as "Y-axis", and a coordinate axis orthogonal to the Y-axis and the Z-axis is referred to as "X-axis".

Figure 2:
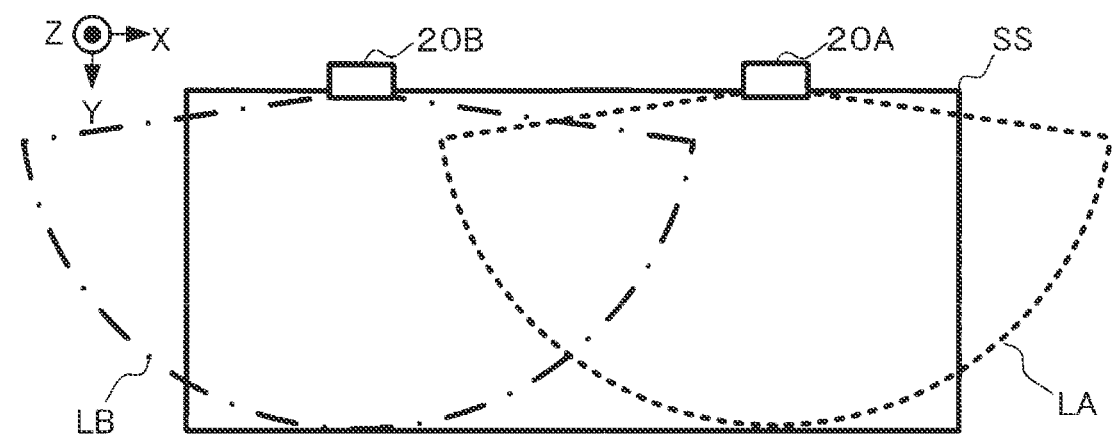
FIG. 2 is a diagram for explanation of IR lights radiated from respective radiation apparatuses for detection of a position of a pointer in the display system.
Figure 3:
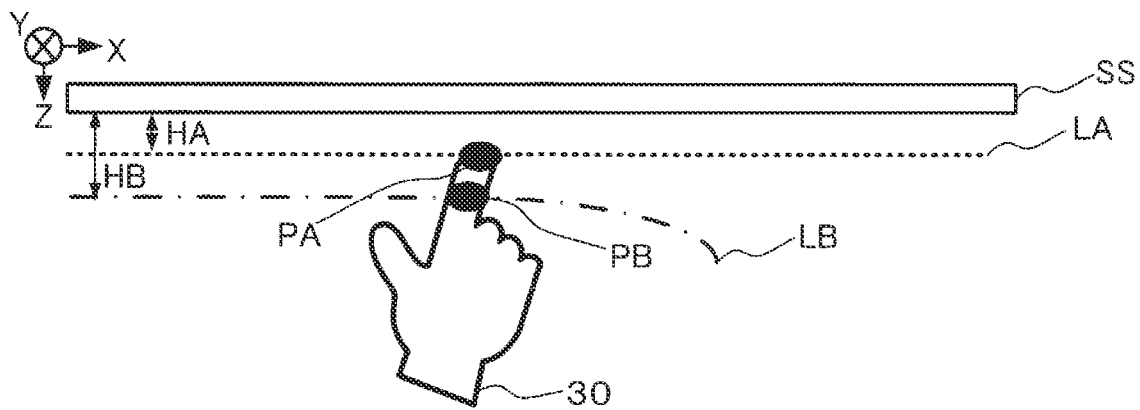
FIG. 3 is a diagram for explanation of IR lights radiated from the respective radiation apparatuses for detection of the position of the pointer in the display system.

The radiation apparatus 20A is a finger touch unit forming a pair with the projector 10A. The radiation apparatus 20B is a finger touch unit forming a pair with the projector 10B. As shown in FIG. 1, the radiation apparatus 20A and the radiation apparatus 20B are placed in line in the X-axis directions above the display surface SS. The radiation apparatus 20A and the radiation apparatus 20B include IR light sources emitting IR lights. The respective radiation apparatus 20A and radiation apparatus 20B radiate the IR lights forming light curtains along the display surface SS. In other words, the respective radiation apparatus 20A and radiation apparatus 20B radiate the IR lights substantially parallel to the display surface SS. FIGS. 2 and 3 are diagrams for explanation of the IR lights radiated from the respective radiation apparatus 20A and radiation apparatus 20B. FIG. 2 shows the IR lights radiated from the respective radiation apparatus 20A and radiation apparatus 20B as seen from the Z-axis direction. FIG. 3 shows the IR lights radiated from the respective radiation apparatus 20A and radiation apparatus 20B as seen from the Y-axis direction. As shown in FIGS. 2 and 3, the radiation apparatus 20A radiates an IR light LA in a sector form in a position at a distance HA apart from the display surface SS in the Z-axis direction along the display surface SS. The IR light LA is an example of a first light in the present disclosure. Similarly, the radiation apparatus 20B radiates an IR light LB in a sector form in a position at a distance HB apart from the display surface SS in the Y-axis direction along the display surface SS. The IR light LB is an example of a second light in the present disclosure.

Figure 4:
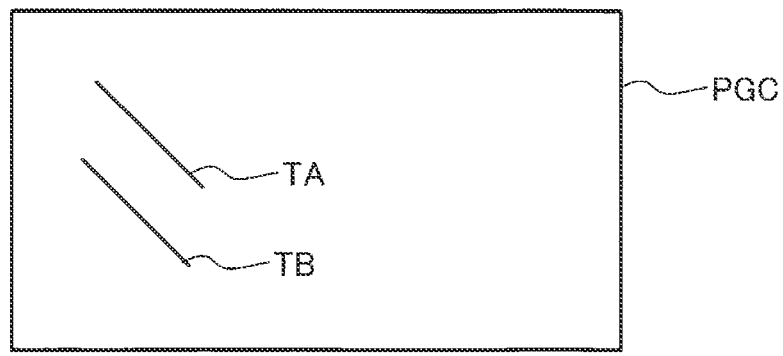
FIG. 4 is a diagram for explanation of a problem caused by the pointer crossing both IR lights.

As shown in FIGS. 2 and 3, the light curtain formed by the IR light LA and the light curtain formed by the IR light LB partially overlap with each other as seen from the Z-axis direction. It is preferable that there is no gap between the light curtain formed by the IR light LA and the light curtain formed by the IR light LB in the Z-axis direction, that is, the distance HA and the distance HB are equal. However, the distance HA and the distance HB may be different depending on a difference between initial settings or the like of the respective radiation apparatus 20A and radiation apparatus 20B. Further, the end portions of the sector-shaped light curtains tend to be curved and the distance HA and the distance HB may be different due to the curvature. When the distance HA and the distance HB are different, as shown in FIG. 3, two bright points of a bright point PA and a bright point PB are generated for one pointer 30. It is assumed that, under a situation in which the two bright points are generated for one pointer 30, the user makes a motion to draw a line segment on the display surface SS using the pointer 30. In this case, in an interactive projector in related art, as shown in FIG. 4, a defect that a display image PGC containing a drawn image showing a line segment TA corresponding to the trajectory of the bright point PA and a line segment TB corresponding to the trajectory of the bright point PB is displayed on the display surface SS is caused. The projector 10 in the embodiment is configured to avoid the above described defect without degrading temporal resolution for the detection of the position of the pointer 30. The projector 10 is an example of a display apparatus in the present disclosure.

Figure 5:
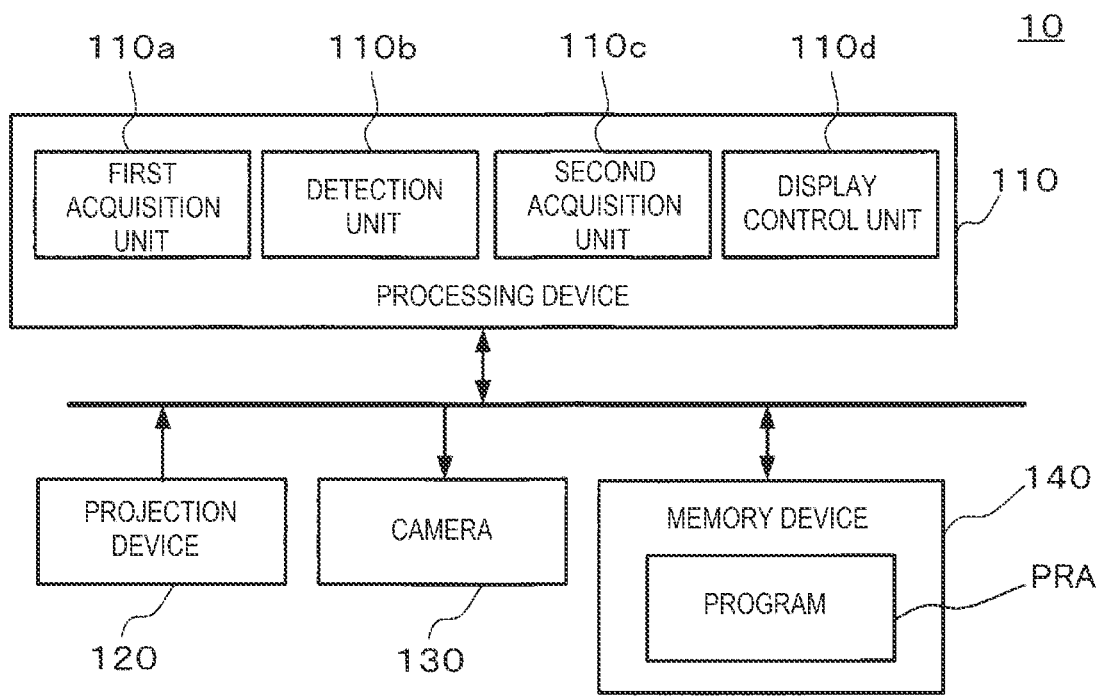
FIG. 5 shows a configuration example of a projector included in the display system.

FIG. 5 shows a configuration example of the projector 10. The projector 10 shown in FIG. 5 includes a processing device 110, a projection device 120, a camera 130, and a memory device 140. The projector 10 includes a communication circuit for communication with the image supply apparatus by wired or wireless connection and an input device such as a keyboard receiving various input operations of the user in addition to the processing device 110, the projection device 120, the camera 130, and the memory device 140. However, the communication device and the input device have little relation with the present disclosure and are omitted in FIG. 5.

The processing device 110 includes e.g., a processor such as a CPU (Central Processing Unit), i.e., a computer. The processing device 110 includes a single processor or a plurality of processors. The processing device 110 operates according to a program PRA stored in the memory device 140, and thereby, functions as a control center of the projector 10.

The projection device 120 includes a projection lens, a liquid crystal drive unit, a liquid crystal panel, and a light source unit. Note that, in FIG. 5, the illustration of the projection lens, the liquid crystal drive unit, the liquid crystal panel, and the light source unit is omitted. The liquid crystal drive unit drives the liquid crystal panel according to the image data supplied from the processing device 110, and thereby, draws a display image represented by the image data on the liquid crystal panel. The light source unit includes a light source e.g., a halogen lamp or a laser diode. The light from the light source unit is modulated with respect to each pixel in the liquid crystal panel and projected as an image light via the projection lens. The image light is projected on the display surface SS, and thereby, the display image is displayed on the display surface SS. Note that the projection device 120 may be configured to project the image light on the display surface SS and may include a digital mirror device (DMD) in place of the liquid crystal drive unit and the liquid crystal panel.

The camera 130 is e.g., an IR camera and the attitude thereof is adjusted to direct the optical axis toward the center of the display surface SS. The camera 130 includes e.g., a CCD (Charge Coupled Device) or a CMOS (Complementary Metal Oxide Semiconductor) as an imaging device converting a light collected by an optical system including a lens into an electrical signal, and an IR light filter for receiving the IR light is attached thereto. The camera 130 captures an image of a predetermined range containing the display surface SS in a predetermined cycle under control by the processing device 110. The camera 130 outputs image data representing the captured image to the processing device 110 at each time when capturing the image of the predetermined range containing the display surface SS.

The memory device 140 is a recording medium readable by the processing device 110. The memory device 140 includes e.g., a non-volatile memory and a volatile memory. The non-volatile memory is e.g., a ROM (Read Only Memory), an EPROM (Erasable Programmable Read Only Memory), or an EEPROM (Electrically Erasable Programmable Read Only Memory). The volatile memory is e.g., a RAM (Random Access Memory).

In the non-volatile memory of the memory device 140, the program PRA for the processing device 110 to execute the display method of the present disclosure is stored in advance. Further, in the non-volatile memory, conversion data for mutual conversion between a position on the captured image captured by the camera 130 and a position on the display image displayed by the projection device 120 is stored in advance. The conversion data is appropriately generated by a known calibration and stored in the non-volatile memory. The volatile memory of the memory device 140 is used by the processing device 110 as a work area when the program PRA is executed.

The processing device 110 reads the program PRA from the non-volatile memory into the volatile memory when power of the projector 10 is turned on, and starts execution of the read program PRA. The processing device 110 operating according to the program PRA functions as a first acquisition unit 110*a*, a detection unit 110*b*, a second acquisition unit 110*c*, and a display control unit 110*d* shown in FIG. 5. The first acquisition unit 110*a*, the detection unit 110*b*, the second acquisition unit 110*c*, and the display control unit 110*d* shown in FIG. 5 are software modules realized by operating the processing device 110 according to the program PRA. The respective functions of the first acquisition unit 110*a*, the detection unit 110*b*, the second acquisition unit 110*c*, and the display control unit 110*d* shown in FIG. 5 are as below.

The first acquisition unit 110*a* acquires the image data output from the camera 130. As described above, in the embodiment, the image of the predetermined range containing the display surface SS is captured by the camera 130. That is, the first acquisition unit 110*a* acquires image data representing a captured image of the predetermined range containing the display surface SS.

The detection unit 110*b* detects bright points corresponding to the reflected light of the light curtain by the pointer 30 from the captured image represented by the image data by analyzing the image data acquired by the first acquisition unit 110*a*. For example, the detection unit 110*b* detects an area where a predetermined number or more pixels e.g., three pixels belong and brightness of the individual pixels is a predetermined value or more as an area corresponding to the bright points in the captured image. Note that, to increase stability in bright point detection, the detection unit 110*b* may detect the bright points after removing a background image obtained by imaging of the display surface SS without the pointer 30 not closer thereto from the captured image.

As described above, in the embodiment, the IR light LA is radiated from the radiation apparatus 20A along the display surface SS and the IR light LB is radiated from the radiation apparatus 20B along the display surface SS. When the user brings the pointer 30 close to the display surface SS for drawing something on the display surface SS, the pointer 30 crosses one or both of the IR light LA and the IR light LB. When the pointer 30 crosses one of the IR light LA and the IR light LB, one bright point corresponding to the reflected light generated by the pointer 30 crossing the IR light appears in the captured image. Therefore, when the pointer 30 crosses one of the IR light LA and the IR light LB, the detection unit 110*b* detects one bright point corresponding to the reflected light of the IR light LA or the IR light LB by the pointer 30.

When one pointer 30 crosses the IR light LA and the IR light LB, the bright point PA corresponding to the reflected light of the IR light LA by the pointer 30 and the bright point PB corresponding to the reflected light of the IR light LB by the pointer 30 appear in the captured image. Therefore, when one pointer 30 crosses the IR light LA and the IR light LB, the detection unit 110*b* detects the bright point PA corresponding to the reflected light of the IR light LA by the pointer 30 and the bright point PB corresponding to the reflected light of the IR light LB by the pointer 30. The bright point PA is an example of a first bright point in the present disclosure. The bright point PB is an example of a second bright point in the present disclosure.

When the pointer 30 crosses only the IR light LA and another pointer different from the pointer 30 crosses only the IR light LB or when the pointer 30 crosses only the IR light LB and the other pointer crosses only the IR light LA, two bright points appear in the captured image. In these cases, the detection unit 110*b* detects the two bright points. Or, when the pointer 30 crosses none of the IR light LA and the IR light LB and the other pointer crosses none of the IR light LA and the IR light LB, no bright points appear in the captured image. In this case, the detection unit 110*b* detects no bright points.

The second acquisition unit 110*c* acquires a placement position when the drawn image showing the drawn line drawn using the pointer 30 is placed on the display surface SS based on the detection result by the detection unit 110*b*. The placement position is an example of a third position in the present disclosure. When no bright points are detected by the detection unit 110*b*, the second acquisition unit 110*c* does not acquire the placement position. This is because, when no bright points are detected by the detection unit 110*b*, it is considered that drawing using the pointer 30 is not performed.

When one bright point is detected by the detection unit 110*b*, the second acquisition unit 110*c* calculates a position of the gravity center of the brightness in the area corresponding to the bright point in the captured image, and acquires the placement position by converting the position of the gravity center to a position on the display image using the conversion data. The position of the gravity center of the brightness refers to a value obtained by weighted averaging of the respective coordinate values of X-coordinates and Y-coordinates of the pixels belonging to the area with the brightness values of the pixels as weights.

When two bright points are detected by the detection unit 110b, the second acquisition unit 110c first determines whether a distance between the two bright points is less than a threshold th1. The threshold th1 is an example of a first threshold in the present disclosure. When the distance between the two bright points is less than the threshold th1, the second acquisition unit 110c determines that the two bright points are generated by one pointer 30 crossing the IR light LA and the IR light LB, and calculates the position of the gravity center of the brightness of the predetermined area containing the two bright points in the captured image and acquires the placement position by converting the position of the gravity center to a position on the display image using the conversion data. That is, when the distance between the two bright points is less than the threshold th1, one placement position is acquired for these two bright points.

The placement is determined in consideration of the brightness in addition to the respective positions of the two bright points for the following reason. When the bright point PA appears in the captured image by the pointer 30 reflecting the IR light LA and the bright point PB appears in the captured image by the pointer 30 reflecting the IR light LB, the bright point PA is often brighter than the bright point PB in an area overlapping with the display image PGA and it is considered that the brighter bright point shows the more accurate position. Further, a specific example of the predetermined area containing the two bright points in the captured image includes an area surrounded by the minimum circle containing the two bright points.

When the distance between the two bright points is equal to or more than the threshold th1, the second acquisition unit 110c determines that the pointer 30 crosses only the IR light LA and the other pointer crosses only the IR light LB or the pointer 30 crosses only the IR light LB and the other pointer crosses only the IR light LA, calculates the position of the gravity center of the brightness with respect to each bright point appearing in the captured image and acquires the placement positions by converting the positions of the gravity center to positions on the display image using the conversion data. That is, when the distance between the two bright points is equal to or more than the threshold th1, one for each of these two bright points, two placement positions in total are acquired.

The display control unit 110d generates image data representing a display image in which the drawn image showing the drawn line by the pointer 30 is placed in the placement position acquired by the second acquisition unit 110c and provides the data to the projection device 120.

Figure 6:
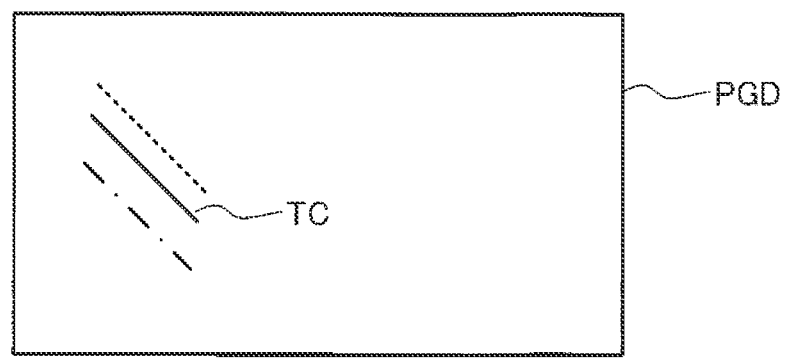
FIG. 6 is a diagram for explanation of an effect of the embodiment.

In the embodiment, as shown in FIG. 3, when the bright point PA and the bright point PB appear in the captured image by one pointer 30 crossing the IR light LA and the IR light LB, as shown in FIG. 6, a display image PGD in which a drawn image showing a drawn line TC is placed in one placement position determined based on the bright point PA and the bright point PB is displayed on the display surface SS. Note that, in FIG. 6, the line segment corresponding to the trajectory of the bright point PA is drawn as a dotted line and the line segment corresponding to the trajectory of the bright point PB is drawn as a dashed-dotted line, however, the line segment corresponding to the trajectory of the bright point PA and the line segment corresponding to the trajectory of the bright point PB are not actually displayed. Therefore, even when the two bright points are imaged for one pointer 30, the defect that the drawn line drawn by the user is doubly drawn is not caused. Note that the applicant confirmed that the above described defect is not caused even when the difference between the distance HB and the distance HA is about 20 mm by an experiment.

Figure 7:
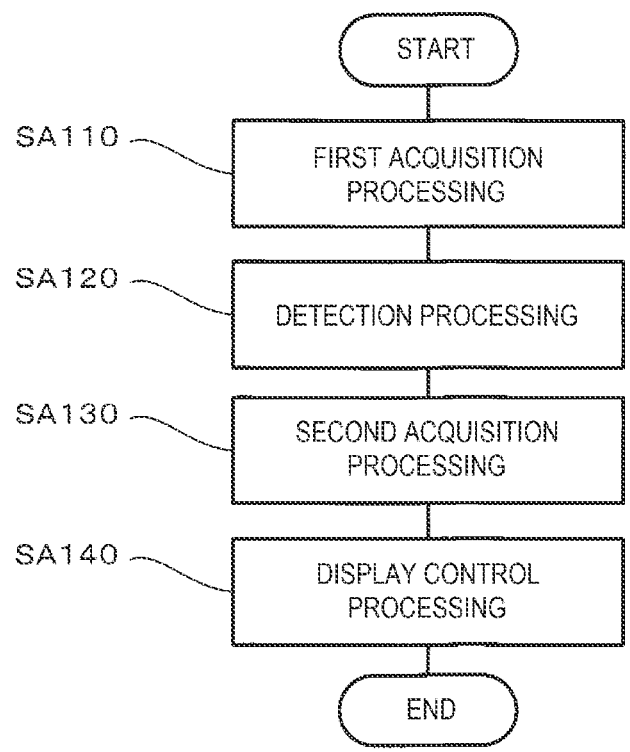
FIG. 7 is a flowchart showing a flow of a display method executed by a processing device according to a program.

The processing device 110 operating according to the program PRA repeatedly executes the display method shown in FIG. 7 in a fixed cycle. As shown in FIG. 7, the display method of the embodiment includes first acquisition processing SA110, detection processing SA120, second acquisition processing SA130, and display control processing SA140.

In the first acquisition processing SA110, the processing device 110 functions as the first acquisition unit 110a. In the first acquisition processing SA110, the processing device 110 acquires the image data representing the captured image of the predetermined range containing the display surface SS.

In the detection processing SA120, the processing device 110 functions as the detection unit 110b. In the detection processing SA120, the processing device 110 detects the bright points corresponding to the reflected light of the light curtain by the pointer 30 from the captured image represented by the image data by analyzing the image data acquired in the first acquisition processing SA110.

Figure 8:
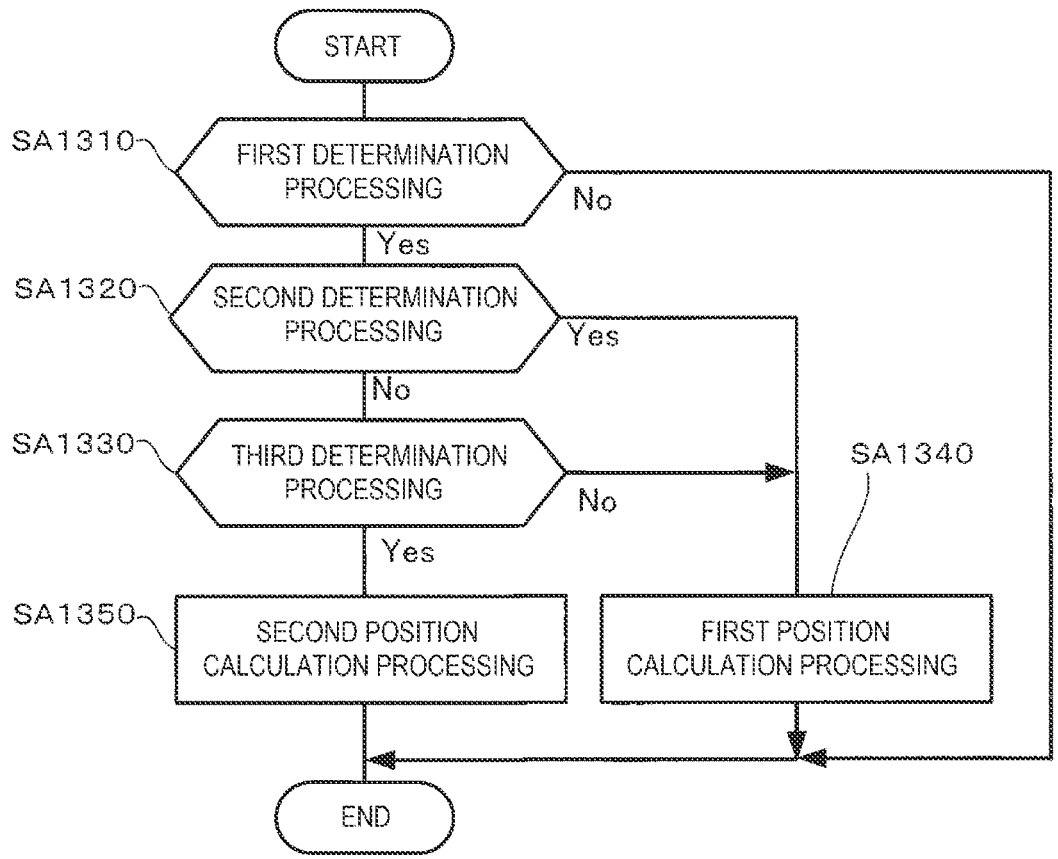
FIG. 8 is a flowchart showing details of second acquisition processing included in the display method executed by the processing device.

In the second acquisition processing SA130, the processing device 110 functions as the second acquisition unit 110c. In the second acquisition processing SA130, the processing device 110 acquires the placement position based on the bright points detected in the detection processing SA120. FIG. 8 is a flowchart showing details of the second acquisition processing SA130. As shown in FIG. 8, the second acquisition processing SA130 includes first determination processing SA1310, second determination processing SA1320, third determination processing SA1330, first position calculation processing SA1340, and second position calculation processing SA1350.

In the first determination processing SA1310, the processing device 110 determines whether a bright point is detected in the detection processing SA120. When no bright point is detected in the detection processing SA120, the determination result of the first determination processing SA1310 is "No", negative. When the determination result of the first determination processing SA1310 is negative, the processing device 110 ends the second acquisition processing SA130 without executing the second determination processing SA1320 and the subsequent processing. In this case, the placement position is not acquired. When one or two bright points are detected in the detection processing SA120, the determination result of the first determination processing SA1310 is "Yes", positive. When the determination result of the first determination processing SA1310 is positive, the processing device 110 executes the second determination processing SA1320.

In the second determination processing SA1320, the processing device 110 determines whether the number of bright points detected in the detection processing SA120 is "1". When the number of bright points detected in the detection processing SA120 is "1", the determination result of the second determination processing SA1320 is "Yes", positive. When the determination result of the second determination processing SA1320 is positive, the processing device 110 executes the first position calculation processing SA1340 and ends the second acquisition processing SA130. When the number of bright points detected in the detection processing SA120 is not "1", the determination result of the second determination processing SA1320 is "No", negative. When the determination result of the second determination processing SA1320 is negative, the processing device 110 executes the third determination processing SA1330.

In the third determination processing SA1330, the processing device 110 determines whether the distance between the two bright points detected in the detection processing SA120 is less than the threshold th1. As described above, when the two bright points are generated by one pointer 30 crossing the IR light LA and the IR light LB, the distance between these two bright points is less than the threshold th1 and the determination result of the third determination processing SA1330 is "Yes", positive. On the other hand, when the first bright point is generated by the pointer 30 crossing the IR light LA and the second bright point is generated by the other pointer crossing the IR light LB, the distance between the first bright point and the second bright point is equal to or more than the threshold th1 and the determination result of the third determination processing SA1330 is "No", negative. When the determination result of the third determination processing SA1330 is the positive, the processing device 110 executes the second position calculation processing SA1350. When the determination result of the third determination processing SA1330 is the negative, the processing device 110 executes the first position calculation processing SA1340.

In the first position calculation processing SA1340, the processing device 110 acquires the placement position of the drawn image by calculating the brightness gravity center with respect to each bright point detected in the detection processing SA120. Therefore, when the number of bright points detected in the detection processing SA120 is "1", one placement position is acquired in the first position calculation processing SA1340. On the other hand, when the number of bright points detected in the detection processing SA120 is "2", two placement positions are acquired in the first position calculation processing SA1340.

In the second position calculation processing SA1350, the processing device 110 acquires one placement position based on the two bright points detected in the detection processing SA120. Specifically, the processing device 110 calculates the position of the gravity center of the brightness in the predetermined area containing the two bright points in the captured image, and acquires one placement position by converting the position of the gravity center to the position on the display image using the conversion data.

In the display control processing SA140, the processing device 110 functions as the display control unit 110d. In the display control processing SA140, when the placement position is acquired in the second acquisition processing SA130, the processing device 110 generates the image data representing the display image containing the drawn image in the placement position and provides the data to the projection device 120. When the placement position is not acquired in the second acquisition processing SA130, the processing device 110 generates the image data representing the display image not containing the drawn image and provides the data to the projection device 120.

As described above, according to the projector 10 of the embodiment, even in the case where two bright points appear in the captured image by the camera 130, when the distance between the two bright points is less than the threshold th1, one placement position is determined based on the two bright points and the image showing the drawn line is displayed in the placement position. Therefore, even when two bright points are imaged for one pointer 30, the defect that the drawn line drawn by the user is doubly drawn is not caused. In addition, in the display system 1 of the embodiment, it is not necessary to make the radiation timing of the IR light LA and the radiation timing of the IR light LB by the radiation apparatus 20A different, and the temporal resolution for the detection of the pointer 30 is not degraded as that in the technique disclosed in JP-A-2017-138871.

2. MODIFICATIONS

The above described embodiment may be modified as below.

(1) In the above described embodiment, when two bright points appear in the captured image obtained by imaging of the display surface SS using the camera 130 and the distance between the two bright points is less than the threshold th1, the placement position is acquired based on the position of the gravity center of the brightness in the area containing the two bright points. However, the placement position may be a position determined based on the two bright points in the captured image and the placement position may be determined based on only the positions of the two bright points without using information on the brightness. For example, the placement position may be acquired based on the position determined by weighted averaging of the position of the bright point PA and the position of the bright point PB using weights determined regardless of the brightness. A specific example of the configuration determining the placement position by weighted averaging includes a configuration determining the placement position by converting a position of a middle point of a line segment with the bright point PA in the captured image as one end point and the bright point PB in the same captured image as the other end point using the conversion data.

(2) In the second position calculation processing SA1350 executed in the projector 10A, when a difference in brightness between the two bright points appearing in the captured image is equal to or more than a threshold th2, the processing device 110 of the projector 10A may acquire a placement position based on the position of the brighter bright point. The threshold th2 is an example of a second threshold in the present disclosure. As described above, when the bright point PA appears in the captured image by the pointer 30 reflecting the IR light LA and the bright point PB appears in the captured image by the pointer 30 reflecting the IR light LB, the bright point PA is often brighter than the bright point PB in the area overlapping with the display image PGA. According to the configuration, compared to a configuration in which a placement position is acquired based on the position of the gravity center of the brightness in the area containing the bright point PA and the bright point PB, the weighted averaging calculation is unnecessary and the placement position may be simply acquired.

Figure 9:
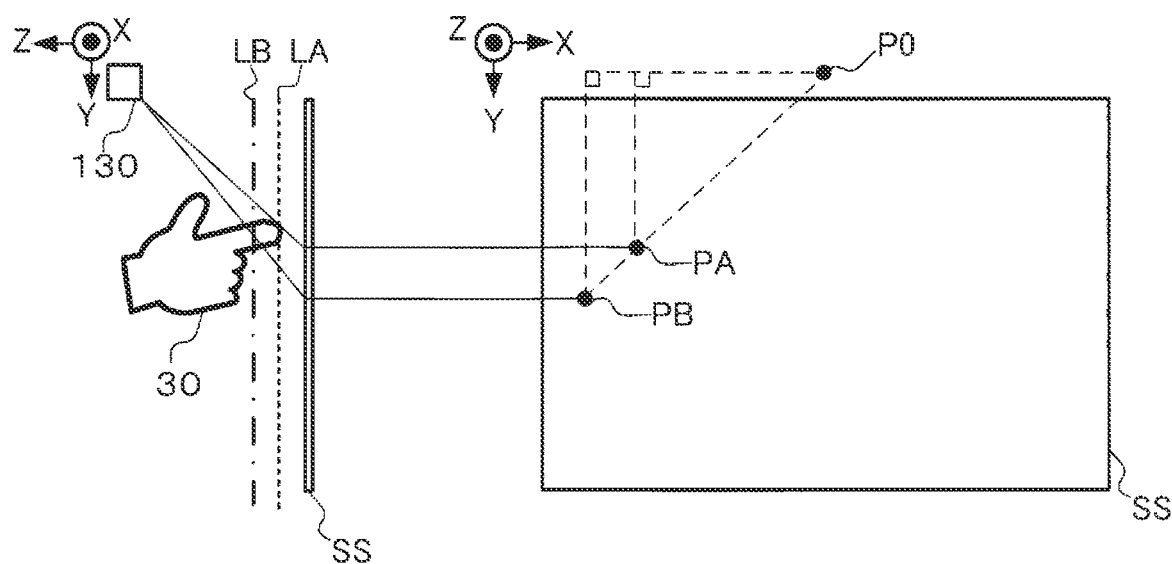
FIG. 9 is a diagram for explanation of Modified Example (2).

Further, in the captured image captured by the camera 130 of the projector 10A, generally, as shown in FIG. 9, the position of the bright point PB corresponding to the reflected light of the IR light LB by the pointer 30 is the position on a straight line connecting a reference position PO on the display surface SS corresponding to the position of the camera 130 and the position of the bright point PA corresponding to the reflected light of the IR light LA by the pointer 30. The position of the bright point PA is an example of a first position in the present disclosure. The position of the bright point PB is an example of a second position in the present disclosure. Note that the reference position PO is a position determined by projection of the camera 130 on a plane containing the display surface SS. Accordingly, in the second position calculation processing SA1350 executed in the projector 10A, the processing device 110 of the projector 10A may acquire the placement position based on the position of the bright point closer to the reference position PO of the two bright points appearing in the captured image. According to the embodiment, compared to the configuration in which the placement position is acquired based on the position of the gravity center of the brightness in the area containing the bright point PA and the bright point PB, the weighted averaging calculation is unnecessary and the placement position may be simply acquired.

(3) The camera 130 is included in the projector 10 in the above described embodiment, however, the camera 130 may not be included in the projector 10, but the camera 130 and the projector 10 may be separately provided. The above described embodiment is an application example of the present disclosure to the projector, however, the present disclosure may be applied to a flat panel display, not limited to the projector. That is, the present disclosure can be applied to any display apparatus displaying an image according to a drawing operation on the display surface by the user.

(4) The first acquisition unit 110a, the detection unit 110b, the second acquisition unit 110c, and the display control unit 110d in the above described embodiment are the software modules. However, any one or more or all of the first acquisition unit 110a, the detection unit 110b, the second acquisition unit 110c, and the display control unit 110d may be hardware modules such as ASICs (Application Specific Integrated Circuits). Even when any one or more or all of the first acquisition unit 110a, the detection unit 110b, the second acquisition unit 110c, and the display control unit 110d may be hardware modules, the same effects as those of the above described embodiment are exerted.

(5) The program PRA may be manufactured singly, or provided with or without charge. Specific forms for providing the program PRA include a form in which the program PRA is written and provided in a computer-readable recording medium such as a flash ROM and a form in which the program PRA is downloaded via an electrical communication line such as the Internet. A general computer is operated according to the program PRA provided in these forms, and thereby, the computer can execute the display method of the present disclosure.

3. SUMMARY OF PRESENT DISCLOSURE

The present disclosure is not limited to the above described embodiment and modified examples, but may be realized in various aspects without departing from the scope thereof. For example, the present disclosure can be realized by the following configurations. The technical features in the above described embodiments corresponding to the technical features in the respective following configurations can be appropriately replaced or combined for solving part or all of the problems of the present disclosure or achieving part or all of the effects of the present disclosure. Further, the technical features not described as essential features in the specification can be appropriately deleted.

As below, the summary of the present disclosure will be appended.

Appendix 1

A display method according to an aspect of the present disclosure includes acquiring a captured image by imaging a range containing a display surface using a camera, detecting a first bright point corresponding to a reflected light of a first light radiated along the display surface and a second bright point corresponding to a reflected light of a second light radiated along the display surface from the captured image, when a distance between the first bright point and the second bright point in the captured image is less than a first threshold, acquiring a third position determined based on the first bright point and the second bright point, and displaying a display image containing a drawn image in the third position on the display surface.

According to the display method described in Appendix 1, even when the first bright point and the second bright point appear in the captured image by one pointer reflecting the first light and second light, one drawn image is displayed in the third position determined based on the first bright point and the second bright point, a drawn image corresponding to the first bright point and a drawn image corresponding to the second bright point are not individually separately displayed. Therefore, the defect that the drawn line drawn by the user using the pointer is doubly drawn is not caused. In addition, in the display method of the embodiment, it is not necessary to make the radiation timing of the first light and the radiation timing of the second light different, and the temporal resolution for the detection of the position of the pointer is not degraded.

Appendix 2

The display method according to Appendix 1, wherein the third position corresponds to a position of a gravity center of brightness in an area containing the first bright point and the second bright point in the captured image.

According to the display method described in Appendix 2, the drawn image may be displayed in the position on the display surface corresponding to the position of the gravity center of the brightness in the area containing the first bright point and the second bright point.

Appendix 3

The display method according to Appendix 1, wherein the acquiring the third position includes acquiring the third position based on a position of the first bright point when the first bright point is brighter than the second bright point.

According to the display method described in Appendix 3, compared to a configuration in which the third position is acquired based on the position of the gravity center of the brightness in the area containing the first bright point and the second bright point, the third position may be simply acquired.

Appendix 4

The display method according to Appendix 1, wherein, with a position on the display surface corresponding to the camera as a reference position, when a first position on the display surface corresponding to the first bright point is closer to the reference position than a second position on the display surface corresponding to the second bright point, the acquiring the third position includes acquiring the third position based on the position of the first bright point.

According to the display method described in Appendix 4, compared to the configuration in which the third position is acquired based on the position of the gravity center of the brightness in the area containing the first bright point and the second bright point, the third position may be simply acquired.

Appendix 5

A display system according to an aspect of the present disclosure includes a display apparatus displaying an image on a display surface, and a camera imaging a range containing the display surface, wherein the display apparatus executes acquiring a captured image by the camera, detecting a first bright point corresponding to a reflected light of a first light radiated along the display surface and a second bright point corresponding to a reflected light of a second light radiated along the display surface from the captured image, when a distance between the first bright point and the second bright point in the captured image is less than a first threshold, acquiring a third position determined based on the first bright point and the second bright point in the captured image, and displaying a display image containing a drawn image in the third position on the display surface.

According to the display system described in Appendix 5, as is the case with the display method described in Appendix 1, the temporal resolution for the detection of the position of the pointer is not degraded, and the defect that the drawn line drawn by the user using the pointer is doubly drawn may be avoided.

What is claimed is:

1. A display method comprising:
   acquiring a captured image by using a camera imaging a range containing a display surface;
   detecting a first bright point corresponding to a reflected light of a first light radiated substantially parallel to the display surface and a second bright point corresponding to a reflected light of a second light radiated substantially parallel to the display surface from the captured image;
   when a distance between the first bright point and the second bright point in the captured image is less than a first threshold,
   acquiring a third position determined based on the first bright point and the second bright point; and
   displaying a display image containing a drawn image in the third position on the display surface.

2. The display method according to claim 1, wherein the third position corresponds to a position of a gravity center of brightness in an area containing the first bright point and the second bright point in the captured image.

3. The display method according to claim 1, wherein the acquiring the third position includes acquiring the third position based on a position of the first bright point when the first bright point is brighter than the second bright point.

4. The display method according to claim 1, wherein with a position on the display surface corresponding to the camera as a reference position, when a first position on the display surface corresponding to the first bright point is closer to the reference position than a second position on the display surface corresponding to the second bright point is, the acquiring the third position includes acquiring the third position based on the position of the first bright point.

5. A display system comprising:
   a display apparatus displaying an image on a display surface; and
   a camera imaging a range containing the display surface, wherein
   the display apparatus executes
   acquiring a captured image by the camera,
   detecting a first bright point corresponding to a reflected light of a first light radiated substantially parallel to the display surface and a second bright point corresponding to a reflected light of a second light radiated substantially parallel to the display surface from the captured image,
   when a distance between the first bright point and the second bright point in the captured image is less than a first threshold,
   acquiring a third position determined based on the first bright point and the second bright point in the captured image, and
   displaying a display image containing a drawn image in the third position on the display surface.

* * * * *